No. 896,844. PATENTED AUG. 25, 1908.
T. MAYHEW.
STEERING GEAR.
APPLICATION FILED JAN. 2, 1908.
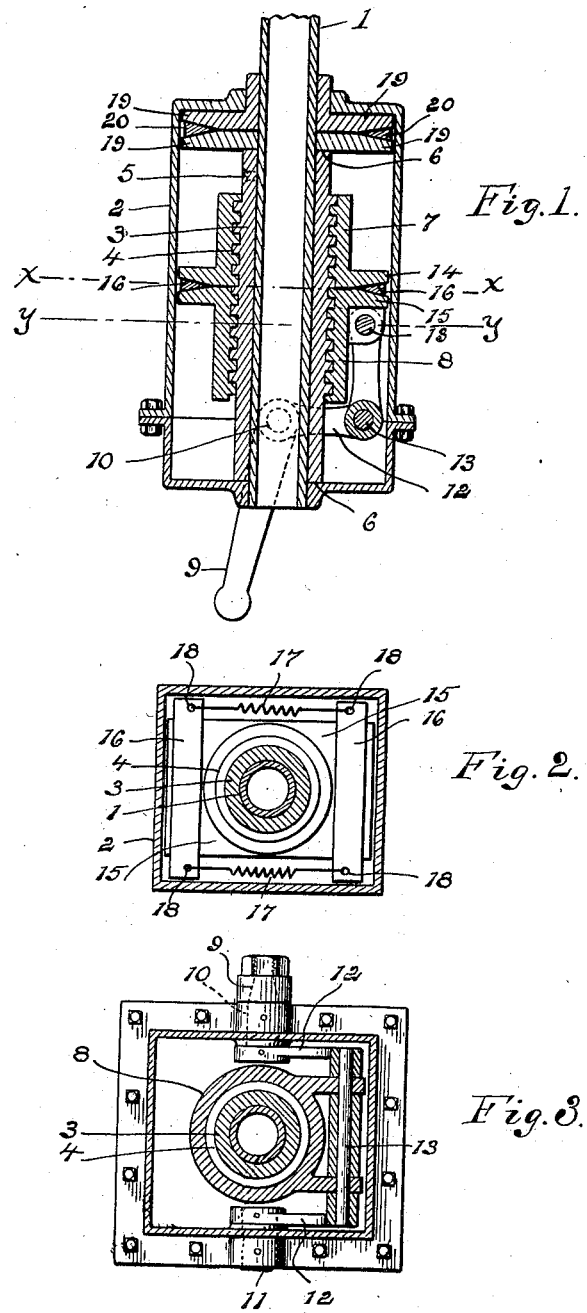
WITNESSES:
A. M. Mayer.
A. M. Dorr.
INVENTOR:
Theophilus Mayhew

UNITED STATES PATENT OFFICE.

THEOPHILUS MAYHEW, OF DETROIT, MICHIGAN.

STEERING-GEAR.

No. 896,844.    Specification of Letters Patent.    Patented Aug. 25, 1908.

Application filed January 2, 1908. Serial No. 408,979.

*To all whom it may concern:*

Be it known that I, THEOPHILUS MAYHEW, a citizen of the United States of America, residing at Detroit, in the county of Wayne and State of Michigan, have invented certain new and useful Improvements in Steering-Gear, of which the following is a specification, reference being had therein to the accompanying drawings.

This invention relates to steering gears for automobiles and the like and especially to means therein for automatically taking up lost motion and preventing back lash in the parts.

The invention consists in the matters hereinafter set forth, and more particularly pointed out in the appended claims.

Referring to the drawings, Figure 1 is a view in longitudinal section of the casing and contained mechanism of a steering gear embodying features of the invention. Fig. 2 is a view in section on or about line $x$—$x$ of Fig. 1. Fig. 3 is a view in section on or about line $y$—$y$ of Fig. 1.

In the drawings, 1 indicates the lower portion of a steering shaft rotatably mounted in an appropriate casing 2 which may be secured in any convenient position in the usual manner. A sleeve 3 having external screw-threads 4 of any desired pitch and type is secured as by a set-screw 5, spline or other preferred means on the spindle within the casing, or the shaft may be enlarged and the threads formed integrally thereon, the annular faces 6 of the sleeve or the shoulders formed by the enlargement acting as thrust bearings to prevent longitudinal movement of the shaft. A nut divided transversely into two abutting sections 7 and 8 engages the sleeve and has non-rotative sliding engagement with the casing. The lower section 8 of the nut operates a steering knuckle 9 through any preferred connection as for example, stub rock shafts 10 and 11, links 12 and pivots pins 13. Flanges 14 and 15 on the abutting ends of the nut sections have sliding engagement with the squared or flattened interior of the casing to prevent rotation of the nut and their opposing faces are inwardly beveled to receive a pair of opposed wedges 16 whose projecting ends are coupled by a pair of springs 17 hooked into apertures 18 to be in tension between them. These wedges automatically prevent any back-lash in the nut sections, as they project them axially in opposite directions against the screw-threads.

The lower annular face 6 of the sleeve or enlarged portion of the shaft engages the casing directly as a thrust bearing. The upper annular face of the sleeve similarly acts as a thrust bearing in the opposite way against the upper end or cap of the casing, a pair of squared non-rotatable washers 19 being interposed. These washers are inwardly beveled like the nut section flanges for a pair of opposed wedges 20 whose projecting ends are coupled by springs in tension between them, similar to the nut wedge springs.

In operation, the wedges automatically move in or out to take up slack between the parts and occasion a smooth, constant yielding engagement between the parts which prevents rattling and jumping. Furthermore, as the slight turns to which the shaft is subjected in use far exceed the rotations through wide arcs, the thread becomes worn more in some of its zones of action than in others. This difference in wear is likewise compensated for by the wedges which keep the nut sections bearing evenly on the threads in all positions, and likewise hold the shaft against endwise play in the casing.

Obviously, changes in details may be made without departing from the spirit of the invention and I do not care to limit myself to any particular form or arrangement of parts.

What I claim as my invention is:—

1. In a steering gear having a casing, a rotatable steering wheel shaft secured therein against longitudinal displacement, and a nut for operating a steering knuckle longitudinally reciprocable on the shaft, means yieldingly movable transversely to the shaft adapted to automatically maintain constant endwise pressure on the nut and on the shaft.

2. In a steering gear having a casing, a rotatable steering wheel shaft secured therein against longitudinal displacement and a nut for operating a steering knuckle transversely divided into a pair of abutting sections having a screw-threaded engagement with the shaft, means yieldingly movable transversely to the shaft adapted to automatically maintain endwise pressure constantly between the shaft and casing and endwise pressure outwardly upon each nut section.

3. In a steering gear having a casing, a rotatable steering wheel shaft secured therein against longitudinal displacement and a nut for operating a steering knuckle transversely divided into a pair of abutting sections in screw-threaded engagement with the shaft having non-rotative sliding engagement in the casing, means within the casing movable transversely to the shaft adapted to automatically maintain a yielding constant endwise pressure between the shaft and casing and outward endwise pressure on each nut section.

4. In a steering gear having a casing, a rotatable steering wheel shaft, end thrust bearings confining the shaft in the casing, a nut non-rotatable in the casing having screw-threaded engagement in the shaft, and spring pressed wedges yieldingly movable transversely to the shaft adapted to maintain a constant endwise pressure between the shaft and its thrust bearings and between the nut and the shaft.

5. In a steering gear, a casing, a steering wheel shaft rotatable therein, a nut for operating a steering knuckle transversely divided into a pair of abutting sections having screw-threaded engagement with the shaft, and spring pressed wedges interposed between the nut sections exerting constant endwise pressure thereon.

6. In a steering gear having a casing, a rotatable steering wheel shaft therein, a nut for operating a steering knuckle transversely divided into two abutting sections having screw-threaded engagement with the shaft and non-rotative sliding engagement with the casing, a pair of oppositely disposed wedges between the adjacent faces of the nut sections adapted to exert endwise pressure outwardly on each section when moved transversely to the shaft and springs adapted to operate the wedges.

7. In a steering gear having a casing, a rotatable steering wheel shaft therein, a nut for operating a steering knuckle transversely divided into two abutting sections having screw-threaded engagement with the shaft and non-rotative sliding engagement with the casing, a pair of oppositely disposed wedges between the adjacent faces of the nut sections adapted to exert endwise pressure outwardly on each section when moved toward the shaft and springs in tension between the wedges.

8. In a steering gear, a casing, a steering wheel shaft rotatable therein, a nut transversely divided into a pair of abutting sections having screw-threaded engagement with the shaft, inwardly beveled flanges on the adjacent ends of the sections having non-rotative sliding engagement with the casing, a pair of inwardly acting wedges between the beveled faces of the flanges on opposite sides of the shaft, and springs in tension connecting the wedges.

9. In a steering gear, a casing, thrust bearings at each end of the casing, a steering wheel shaft rotatable therein having shoulders adapted to engage the thrust bearings, a pair of washers interposed between one of the shoulders and the adjacent thrust bearing, spring pressed wedges between the washers yieldingly separating them, a nut for operating a steering knuckle transversely divided into a pair of abutting sections having screw-threaded engagement with the shaft, and spring pressed wedges interposed between the nut sections exerting constant endwise pressure thereon.

10. In a steering gear, a rectangular casing provided with end thrust bearings, a steering wheel shaft axially journaled therein provided with shoulders adapted to engage the thrust bearings and exteriorly screw-threaded within the casing, a pair of squared inwardly beveled washers on the shaft between a shoulder and adjacent thrust bearing having non-rotative axially movable engagement with the casing, wedges interposed between the beveled margins of the washers held from longitudinal displacement by the casing and adapted to force the washers apart when moved toward each other, springs connecting the corresponding ends of the wedges adapted to yieldingly draw them together, a nut transversely divided into a pair of abutting sections having screw-threaded engagement with the casing, a pair of oppositely disposed wedges interposed between the adjacent beveled faces of the sections adapted to force them apart when moved toward each other and prevented from longitudinal displacement by the casing, and springs in tension between the corresponding ends of the wedges adapted to draw them together.

In testimony whereof I affix my signature in presence of two witnesses.

THEOPHILUS MAYHEW.

Witnesses:
C. R. STICKNEY,
OTTO F. BARTHEL.